(No Model.)
M. CAMPBELL.
CLUTCH.
No. 520,949.
Patented June 5, 1894.
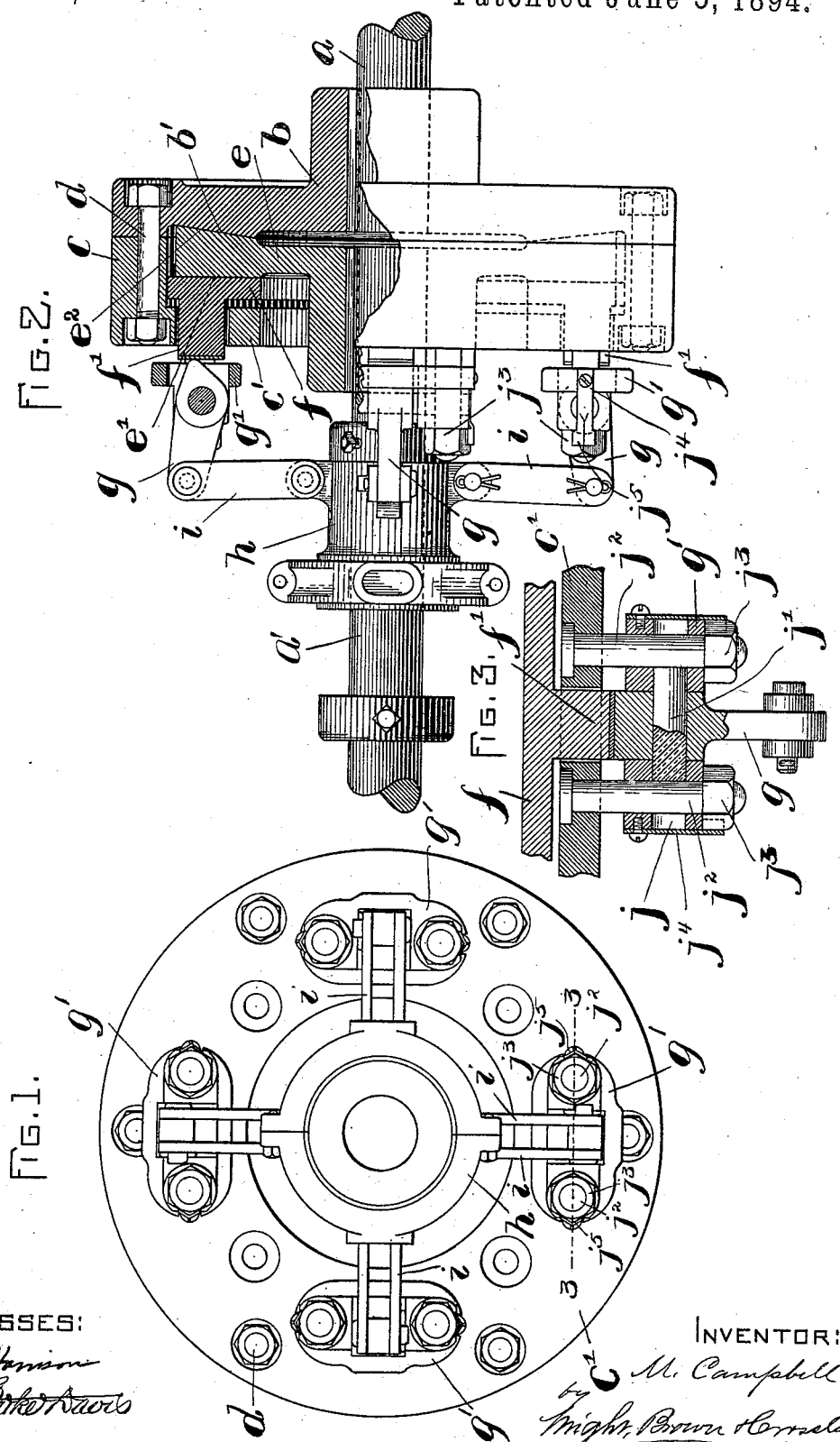
WITNESSES:
INVENTOR:
M. Campbell

UNITED STATES PATENT OFFICE.

MALCOLM CAMPBELL, OF BOSTON, MASSACHUSETTS, ASSIGNOR TO THE WOONSOCKET MACHINE AND PRESS COMPANY, OF WOONSOCKET, RHODE ISLAND.

CLUTCH.

SPECIFICATION forming part of Letters Patent No. 520,949, dated June 5, 1894.

Application filed October 11, 1893. Serial No. 487,837. (No model.)

*To all whom it may concern:*

Be it known that I, MALCOLM CAMPBELL, of Boston, in the county of Suffolk and State of Massachusetts, have invented certain new and useful Improvements in Friction-Clutches, of which the following is a specification.

This invention has reference to friction clutches, and it is the object to produce a clutch of this character, which shall be more simple and inexpensive in construction and more effective and durable in operation than its predecessors.

In the embodiment of the invention, the aim has been to reduce the number of parts to the minimum and render the structure compact. It is a desideratum in friction clutches that the clutch members separate readily, and also that the alignment of the divided shaft be maintained; and these desiderata have been kept in view in the production of this clutch.

Reference is to be had to the annexed drawings, and to the letters marked thereon, forming a part of this specification, the same letters designating the same parts or features, as the case may be, wherever they occur.

Figure 1 shows an end view of the clutch. Fig. 2 shows a part side elevation and part section. Fig. 3 shows an enlarged section, taken on the line 3—3 of Fig. 1.

In the drawings, the letters $a$ and $a'$ designate the two confronting members of a divided shaft, from one of which motion is to be transmitted to the other. To the right-hand member $a$ is affixed a circular head $b$, the inside of which is formed with a beveled annular portion $b'$. An annulus $c$ is secured by bolts $d$ to the head $b$, said annulus surrounding the left-hand member $a'$ of the shaft, and having an inward-extending flange $c'$. The head $b$ and annulus $c$ form practically one solid piece, and are made separate simply to permit the parts hereinafter named to be inclosed within the same. A circular head $e$ is affixed to the left-hand member $a'$, and on one side it is formed with a beveled annular surface $e^2$, corresponding exactly with and adapted to engage the beveled surface $b'$ of the head $b$. The engagement of these two beveled surfaces insures and maintains a perfect alignment of the shaft. On the opposite side of the head $e$ is a straight annular friction-surface $e'$, and a ring $f$, inclosed within the head $bc$ and carried thereby, has a flat side adapted for frictional contact with said surface $e'$ in connecting the shafts. The said ring has projections $f'$, extending through holes provided for them in the flange $c'$ of the annulus $c$, and may move longitudinally to lock and release the clutch, the said ring being guided in its movements by the projections $f'$ and openings in the flange $c'$.

The means employed for operating the clutch are as follows: The projections $f'$ present bearing-surfaces beyond the flange $c'$, and cam-levers $g$ are pivoted in supports $g'$ secured to the head $bc$, and bear against the surfaces of said projections. A sleeve $h$ is mounted on the shaft $a'$, and is connected by links $i$ with the cam-levers $g$, whereby toggles are formed, and reciprocations of the sleeve produce actions of the cam-levers, so that, under one direction of movement of the sleeve, the cam-levers crowd the ring $f$ against the head $e$, and produce a frictional connection of the shafts; whereas, under the opposite direction of movement of the sleeve, the ring is released and the connection broken. The left-hand member of the shaft is permitted a slight longitudinal play, so that the ring $f$ may crowd the head $e$ against the head $b$ and effect a frictional connection between the beveled surfaces $b'$ and $e^2$. The head $bc$ presents a peripheral surface, which may receive a belt.

I employ a novel construction for supporting the cam-levers $g$, best illustrated in Fig. 3. Each of the supports $g'$ is in the form of a plate, slotted to receive the cam-lever, and having a longitudinal bore $j$, into which is introduced the fulcrum-pin $j'$ of said lever. Said plate is also provided with transverse bores on each side, which receive bolts $j^2$, connecting the plate with the flange $c'$ and extending across the ends of the fulcrum-pin $j'$, whereby they retain the latter in its proper place. By turning the nuts $j^3$ of said bolts, the clutch may be adjusted as desired. The nuts are locked by means of springs $j^4$, fastened to the plate $g'$ and having angular ends $j^5$ which engage the corners of the nuts. These springs permit the nuts to be turned, but lock them in whatever position they are left. Said nuts extend over the plate back of the fulcrum-pin $j'$, and thus strengthen the plate at each side.

Having thus explained the nature of the invention and described a way of constructing and using the same, although without attempting to set forth all of the forms in which it may be made or all of the modes of its use, it is declared that what is claimed is—

1. A friction-clutch, comprising a disk carried by one part, a head carried by the other part and adapted for frictional engagement with one side of said disk, said head having a flange which extends over the opposite side of the disk and is provided with openings, a friction-ring inclosed in the head and adapted for contact with the disk, said ring having projections which engage the openings in the flange of the head, and means acting against said projections to move the ring, disk and head into frictional engagement.

2. A friction-clutch, comprising a disk on one part, a head on the other part for contact with said disk, a loose ring to bear against the disk, a cam-lever to operate the ring, a plate supporting the fulcrum-pin of said lever, bolts connecting said supporting plate with the head and extending across the ends of the fulcrum pin, and means for actuating the lever.

3. A friction-clutch, comprising a disk on one part, a head on the other part for contact with said disk, a loose ring to bear against the disk, a cam-lever to operate the ring, a plate supporting the fulcrum-pin of said lever, bolts connecting said supporting plate with the head and confining the fulcrum-pin in place, nuts on the bolts, and nut-locks consisting of springs fastened to the plate and having angular ends engaging the corners of the nuts.

In testimony whereof I have signed my name to this specification, in the presence of two subscribing witnesses, this 16th day of June, A. D. 1893.

MALCOLM CAMPBELL.

Witnesses:
ARTHUR W. CROSSLEY,
A. D. HARRISON.